(12) United States Patent
Maier et al.

(10) Patent No.: US 9,095,796 B2
(45) Date of Patent: Aug. 4, 2015

(54) CONNECTING ELEMENT FOR MULTILAYER MEDIA, FILTER ELEMENT, AND METHOD FOR CONNECTING LAMINAR MEDIA

(75) Inventors: Michael Maier, Reisbach (DE); Klaus Gehwolf, Mamming (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 773 days.

(21) Appl. No.: 13/377,709

(22) PCT Filed: Jun. 15, 2010

(86) PCT No.: PCT/EP2010/058349
§ 371 (c)(1),
(2), (4) Date: Jan. 10, 2012

(87) PCT Pub. No.: WO2010/146037
PCT Pub. Date: Dec. 23, 2010

(65) Prior Publication Data
US 2012/0097593 A1 Apr. 26, 2012

(30) Foreign Application Priority Data
Jun. 16, 2009 (DE) .......................... 10 2009 025392

(51) Int. Cl.
*B01D 27/06* (2006.01)
*B01D 29/11* (2006.01)
(Continued)

(52) U.S. Cl.
CPC .............. *B01D 29/111* (2013.01); *B01D 27/06* (2013.01); *B01D 29/213* (2013.01); *B29C 65/4815* (2013.01); *B29C 65/5021* (2013.01);
(Continued)

(58) Field of Classification Search
USPC ............................................... 210/232, 493.1
See application file for complete search history.

(56) References Cited

U.S. PATENT DOCUMENTS 4,184,966 A * 1/1980 Pall ............................ 210/493.2
5,114,508 A * 5/1992 Miyagi et al. .................... 156/69
(Continued)

FOREIGN PATENT DOCUMENTS

BE 435431 A 8/1939
DE 3128546 A1 2/1983
(Continued)

OTHER PUBLICATIONS

DPMA Office Action of DE 10 2009 025 392, Jul. 29, 2010.
DPMA Office Action of DE 10 2009 025 392, Jan. 20, 2010.

*Primary Examiner* — Thomas M Lithgow
(74) *Attorney, Agent, or Firm* — James Hasselbeck (57) ABSTRACT

A connecting element (1) for connecting at least two end portions (2A, 3A) of a flat filter medium (2, 3) has at least three legs (1A, 1B, 1C), one end portion (2A, 2B) each being introducible between two legs (1A, 1B, 1C). Under the influence of heat it is possible to connect the material of the legs with the material of the filter medium (2). The connecting element (1) can be used in a filter element (4) and in particular in a filtering device (5), for example an operating fluid filter for a motor vehicle. The object of a method for connecting at least two end portions (2A, 3A) of a flat filter medium (2, 3) is that the end portions (2A, 3A) are introduced between two legs (1A, 1B, 1C) each of a corresponding connecting element (1) and that through heating the material of the legs is connected with the material of the filter medium (1).

6 Claims, 5 Drawing Sheets

(51) Int. Cl.
  *B01D 29/21* (2006.01)
  *B29C 65/50* (2006.01)
  *B29C 65/00* (2006.01)
  *B29C 65/48* (2006.01)
  *B29C 65/08* (2006.01)
  *B29C 65/16* (2006.01)
  *B29L 31/14* (2006.01)

(52) U.S. Cl.
  CPC ......... *B29C65/5071* (2013.01); *B29C 65/5085* (2013.01); *B29C 66/5344* (2013.01); *B29C 66/5346* (2013.01); *B29C 66/723* (2013.01); *B01D 2201/127* (2013.01); *B29C 65/08* (2013.01); *B29C 65/16* (2013.01); *B29L 2031/14* (2013.01); *Y10T 29/49826* (2015.01)

(56) References Cited

U.S. PATENT DOCUMENTS

| | | | |
|---|---|---|---|
| 6,949,155 B1 * | 9/2005 | Lang et al. | 156/73.1 |
| 7,018,493 B2 * | 3/2006 | Altmeyer et al. | 156/73.1 |
| 2006/0065592 A1 * | 3/2006 | Terres et al. | 210/493.1 |
| 2008/0245726 A1 | 10/2008 | Senetar | |

FOREIGN PATENT DOCUMENTS

| | | |
|---|---|---|
| DE | 4443676 A1 | 6/1996 |
| DE | 19828049 A1 | 12/1999 |
| EP | 0187358 A2 | 7/1986 |
| GB | 614684 A | 12/1948 |
| WO | WO03009922 A1 | 2/2003 |

* cited by examiner

CONNECTING ELEMENT FOR MULTILAYER MEDIA, FILTER ELEMENT, AND METHOD FOR CONNECTING LAMINAR MEDIA

CROSS REFERENCE TO RELATED APPLICATIONS

This application is US National Stage Entry of international patent application no. PCT/EP2010/058349, filed Jun. 15, 2010 designating the United States of America, the entire disclosure of which is incorporated herein by reference. Priority is claimed based on Federal Republic of Germany patent application no. 10 2009 025392.0, filed Jun. 16, 2009, the entire disclosure of which is incorporated herein by reference.

TECHNICAL FIELD

The present invention concerns a connecting element for multilayer media such as, for example, nonwoven filter materials used in filter elements. Moreover, a filter element, a filter device, and a method for connecting flat media is disclosed.

In order to filter, for example, in the automotive field, fluids such as fuels, operating media or passenger compartment air, folded or pleated nonwoven filter materials are often used. In this connection, it is often required to connect different edges or end sections of these flat filter materials to each other. Known filter elements, for example, are manufacture of initially zigzag-shape folded filter material sheets that are shaped to a tubular body. In order to close the tubular body, the end sections of the folds must then be connected to each other fluid-tightly.

PRIOR ART

In the past, in this context metal clips or clamps were used, for example, that hold together two flat sections resting on each other. It is also conventional to adhesively connect the two filter material sheets to each other or to connect them to each other only by pressure or by multiple additional folding. In particular in case of multilayer filter media, for example, several layers of thin nonwoven material that is impregnated or has special intermediate layers, it is difficult to prevent fraying at the edges that are resting against each other. A particular difficultly resides in that the flat media to be connected must be connected fluid-tightly with each other, i.e., the fluid to be filtered must not pass unfiltered through the filter material at the connecting location. Moreover, the connecting location must be such that the cleanliness of the component is ensured.

In view of this background, the present invention has the object to provide an improved connecting element, in particular for terminal folds of filter bellows media.

SUMMARY OF THE INVENTION

This object is solved by a connecting element according to claim 1.

Accordingly, a connecting element for connecting at least two end sections of a flat filter medium is proposed which has at least three legs. In this context, between two legs an end section of the flat filter medium is insertable, respectively, and by heat application and/or pressure the leg material can be joined to the material of the filter medium.

The legs that can also be considered webs or ribs of an elongate profile enable a safe securing action of the filter media that, in particular, by heat application in the joining area, are surrounded by the leg material or are partially fused therewith.

For example, the legs can be designed of such a flat configuration that they cover on either side the end sections of the filter medium, respectively. This means, for example, in case of joining two flat end sections, that a material sequence of leg material, filter media material, leg material, filter media material, and leg material is produced. As a result of the leg material that is also positioned between the filter media, in particular in case of multilayer flat filter media, a particularly good connection of the latter with each other is realized.

The legs, for example, can also converge at a common edge of the connecting element. In this context, it is possible that two legs each define a predetermined angle with each other. Accordingly, one can speak of a fan-shaped connecting element. It is also conceivable that the connecting element has an E-shaped profile wherein between the legs of the E an intermediate space for insertion of the respective end section of the filter medium remains.

In one embodiment of the connecting element the connecting element has a W-shaped profile and is formed of a folded strip. In case of a W-shaped profile the connecting element comprises four legs. It is then possible that the two end sections are located in the intermediate spaces of outer neighboring legs of the W-shaped profile, respectively.

The connecting element comprises preferably a thermoplastic material, for example, thermoplastic synthetic material. Thermoplastic materials can be deformed by heat application and therefore provide an especially excellent joining of material between the leg materials and the materials of the filter medium. Thermoplastic materials can be heated, for example, by heated plungers, "laser welding", vibration welding, ultrasonic welding or thermoprinting and in this way can be joined with the filter media material.

Preferably, the connecting element has a support material layer and a connecting material layer, wherein the material of the connecting material layer can be joined with the material of the filter medium.

For example, the connecting element can be designed such that the connecting material layer adjoins the material of the filter medium, respectively, and, by means of heat, provides a fixed sealing action, for example, by partial or complete mutual fusing.

Moreover, at least two legs of the connecting element can be shaped such that an end section inserted between the two legs is secured by means of clamping action. This facilitates manufacture and, for example, thermal joining of the connecting element with the inserted filter medium in a manufacturing process. The two leg edges of the at least two legs that are arranged distal to the common edge of the connecting element, exert, for example, a clamping force relative to each other. The legs can be arc-shaped in this context.

The connecting element can also have several insertion means that are formed by intermediate spaces between the legs so that several end sections to be connected can be inserted. For example, several layers of a flat filter medium, respectively, can be inserted into individual inserts and then fused with each other by the connecting element. The legs are, for example, of a rectangular shape but can also have other geometries, for example, material-saving geometries. The connecting element is preferably monolithic with respect to material, for example, of a single synthetic material.

A filter element has accordingly a flat filter material with at least two end sections wherein a connecting element as described above secures the two end sections relative to each other. In this connection the end sections may originate from a single, for example, folded filter material sheet, or several sheets or leaves of filter materials may also be joined with each other. In this context, the filter medium may comprise several layers, for example, an absorber material such as active carbon particles can be filled in between the layers.

In a further embodiment of the filter element, the filter element is part of an operating medium filter, a fuel filter, an air filter, or a passenger compartment filter for a motor vehicle.

Finally, a filter device is proposed that comprises an appropriate filter element and forms an operating medium filter, such as, for example, a fuel filter, an oil filter, or an air filter or passenger compartment filter for a motor vehicle.

In a method for connecting at least two end sections of a flat filter medium, the end sections are inserted between two legs, respectively, of a connecting element as described above. Subsequently, heating of the leg material and/or of the material of the filter medium takes place so that the two materials are joined with each other. In this connection, a fluid-tight closure of the edges of the filter medium resting on each other, respectively, is realized. Heating can be done, for example, by ultrasonic welding or laser welding.

In a variant of the method, the connecting element is formed by heating and/or connecting with each other two connecting element parts that surround the end sections individually, respectively. In this regard, it is possible to configure the connecting element of a two-part configuration, for example, by two-U-shaped profiles wherein the two U shapes surround the end sections to be connected. By connecting two parallel legs of the two U-shaped profiles, a three-leg connecting element connected with the material of the filter medium results.

Further possible implementations of the invention comprise also combinations that are not explicitly mentioned of features disclosed above or in the following with regard to the embodiments or embodied variants. In this context, a person of skill in the art will also add individual aspects as improvements or supplements to the respective basic form of the invention.

Advantageous variants and further developments of the invention are subject matter of the dependent claims as well as of the embodiments disclosed in the following.

BRIEF DESCRIPTION OF THE DRAWINGS

The invention will be explained moreover in the following in more detail with the aid of several embodiment with reference to the attached Figures. It is shown in.

In the Figures same or functionally the same elements, inasmuch as nothing else is mentioned, are identified with the same reference numerals.

EMBODIMENT(S) OF THE INVENTION

Figure 1A:
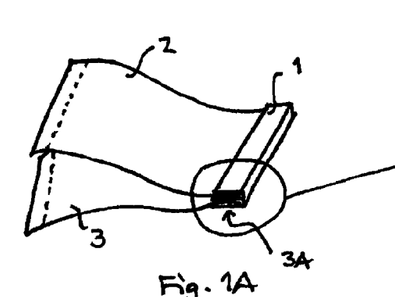
FIG. 1 an illustration of a first embodiment of a connecting element.

FIG. 1 shows a perspective illustration and a cross-sectional illustration of a first embodiment of a connecting element. In FIG. 1A two flat filter media 2, 3, for example, as filter material sheets, are illustrated. In order to connect two end sections in the area 3A of the filter medium to each other, an E-shaped connecting element 1 is used.

Figure 1B:
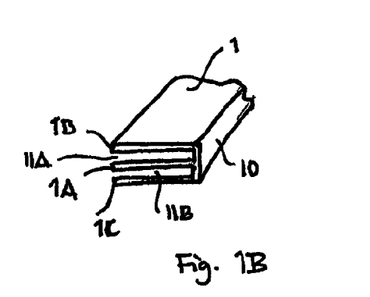

In FIG. 1B a detail view of the connecting element 1 is illustrated wherein an E-shaped profile is shown. As an alternative to the E-shaped profile, in all embodiments of the invention also an M-shaped profile can be used, for example. The connecting element is, for example, made of a synthetic material that has thermoplastic properties. The connecting element 1 is, for example, made of polypropylene material that has a softening point of approximately 150 to 160 degrees C. Of course, also other thermal material properties are conceivable. The preferably synthetic material is selected to be matched to the respective manufacturing process and to the filter media as well as the field of application.

The connecting element 1 which may be formed as a plastic strip with an E-shaped profile has thus three legs 1A, 1B, 1C that each have a rectangular cross-section. The thickness of the legs 1A, 1B, 1C can be selected according to the filter media 2, 3. Between two legs each, for example, between the leg 1A and 1B, an intermediate space 11A is provided in which one of the end sections of the filter material 2 can be inserted. Moreover, between the legs 1A and 1C that can also be characterized as ribs, there is also an intermediate space 11D into which the end section 3A of the second filter material sheet 3 can be inserted.

By welding or other thermal application, a closure of the two end sections of the filter sheets resting on each other is generated. Since the end sections of the filter media, for example, a nonwoven filter material, each are enclosed on both sides by the synthetic material of the connecting element 1, an especially good adhesion and a safe connection result, for example, by ultrasonic welding. In particular when the filter material sheets already comprise several layers, a process-safe connection also of the inner layers with each other is achieved. In this context, by means of a melting process of the material of the connecting element 1, the latter can also penetrate, at least partially, into the nonwoven filter material. Splaying of the layers is thus prevented, also because in particular an edge 10 forms the closure. In this way, it is prevented that the cleanliness of the component is impaired by fibers that may escape.

Figure 2:
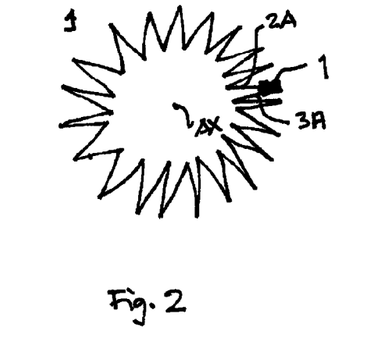
FIG. 2 a cross-sectional view of an embodiment of a filter element.

FIG. 2 shows a cross-sectional view of an embodiment of a filter element. Often, for example, filter material sheets are folded to a pleated arrangement, i.e., bent in a zigzag shape and then joined to a cylinder. In FIG. 2, a plan view or a cross-section of the cylinder axis AX is shown. The filter element 4 must be formed by the folded filter material wherein two end sections 2A, 3A each are connected to each other at terminal fold edges. For this purpose, for example, the connecting element as illustrated in FIG. 1 is used. The connecting element 1 thus encloses in a fluid-tight way both terminal fold edges.

The corresponding filter element 4 is used particularly in automotive filters, for example, for oil, fuel, or air filter. In principle, the connecting element can be used in all types of filters in which flat media are to be connected to each other along an edge or sections in a fluid-tight way.

Figure 3:
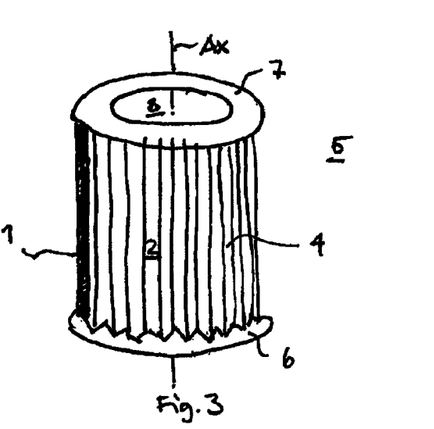
FIG. 3 an illustration of an embodiment of a filter device.

In FIG. 3, for example, a perspective view of a filter device 5 is illustrated. The filter element 4, as illustrated in FIG. 2, is in this context, for example, glued or connected to each other in other ways of a lower bottom plate 6. The bottom plate 6 provides a fluid-tight closure of the cylinder of the filter element 4 that is formed of the pleated filter material 2. A top closure is formed by an annular plate 7 that, as shown in FIG. 3, is attached to the upper fold profile of the filter element 4. In this context, welding or gluing of the upper and lower closures 6, 7 can be realized. As already explained in FIG. 2, a terminal fold section is fluid-tightly connected by a connecting element 1, respectively. In this way, a filter interior 8 is formed into which, for example, a fluid can penetrate through the opening of the upper plate 7, pass through the filter material 2 and exit as clean air.

Figure 4:
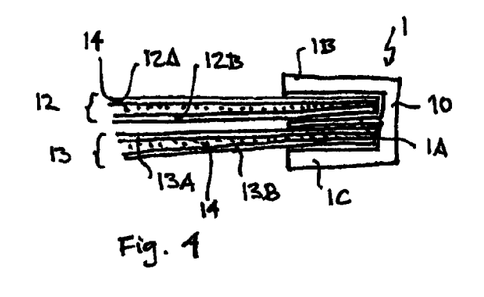
FIG. 4 an illustration of a second embodiment of a connecting element.

In FIG. 4, a second embodiment of a connecting element is illustrated. An E-shaped profile of the connecting element 1 is assumed. The connecting element 1 has a common edge 10 for the legs 1A, 1B, and 1C. A central leg 1A is provided that, for example, has a reduced thickness in comparison to the outer legs 1B and 1C. Into the intermediate spaces between the legs 1A and 1B a multilayer filter medium is inserted, respectively. In this context, a first filter medium 12 and a second filter medium 13 and a corresponding end section are illustrated. The two flat filter media each are manufactured of two layers 12A, 12B, 13A, 13B wherein between the respective layers, for example, active carbon particles 14 are deposited. In this way, the filter action and the absorption properties of the filter medium are improved.

Since in particular these multilayer filter media 12, 13 may fray at their terminal edges, the proposed connecting element 1 is particularly suitable. This is so because, on the one hand, an edge closure 10 results and, on the other hand, an improved gluing action or connection is achieved between the inner layers 13A, 12B shown in FIG. 4 by the central stay or the central leg 1A of the connecting element 1. It is, for example possible in a simple way by ultrasonic or laser welding to heat at least the legs 1A, 1B, 1C for a short period of time and to cause them to melt partially so that the leg material and the nonwoven filter material will at least partially be joined.

Figure 5:
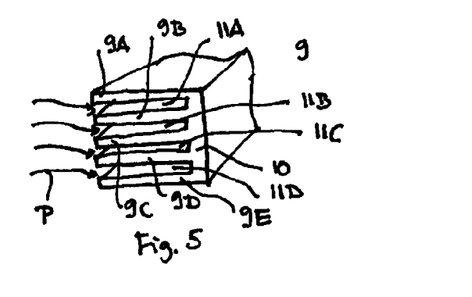
FIG. 5 an illustration of a third embodiment of a connecting element.

In FIG. 5, a third embodiment of a connecting element is illustrated. The connecting element 9 has in this context five legs 9A-9E wherein four intermediate spaces 11A-11D are formed into which a respective end section of the filter media to be connected can be inserted. This is indicated by the arrows P. Into the intermediate spaces 11A-11D, for example, the individual layers of the multilayer filter material sheets to be connected can be inserted. It is however also conceivable to connect in case of certain filter element geometries several of the filter material sheets with each other. As a result of the configuration of the connecting element, between the filter layers to be connected a material section is formed that is comprised of the leg material. This leads to a particularly good connection of all flat media to be connected.

In FIG. 6, several illustrations of method states for connecting flat filter media with use of a connecting element as described above are illustrated. FIG. 6A shows first two filter material sheets 2, 3 whose end sections 2A, 3A are to be connected to each other. Moreover, a connecting element 1 is provided that has several legs wherein between two legs, respectively, an insertion means 11A, 11B is present. As illustrated by the arrows P, the end sections 2A, 3A are inserted into the insertion means or intermediate spaces 11A, 11B.

Figure 6A:
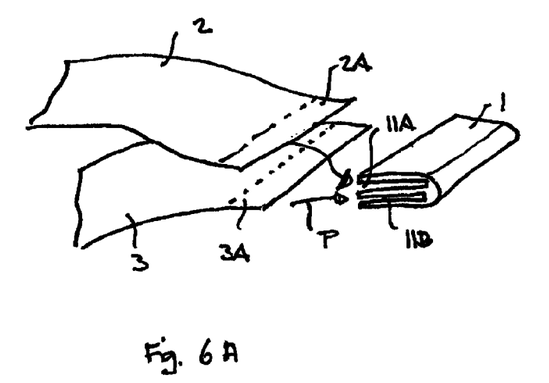
FIGS. 6, 7 illustrations of method steps of a further embodiment of a method for connecting flat filter media.
Figure 6B:
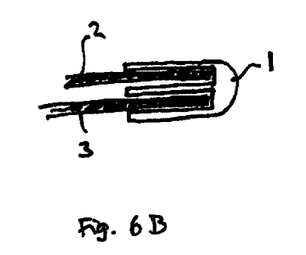
Figure 6C:
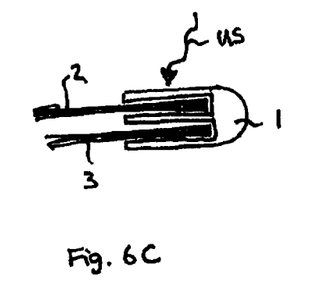

FIG. 6B shows in profile the situation after the end sections of the filter material sheets 2, 3 have been inserted into the connecting element 1. Subsequently, heating of the section where the end sections of the filter material sheets are located between the legs of the connecting element 1 is carried out. This is illustrated in FIG. 6C. For example, by means of ultrasonic radiation US, welding of the filter material with the connecting element material can be realized. It is also possible, by means of a laser beam, to partially melt the material layers along the edge of the connecting element, as indicated by arrow US.

Figure 6D:
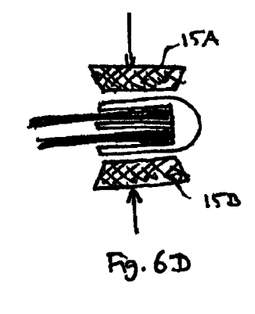

FIG. 6D shows, for example, the process of welding by means of welding by ultrasound. For this purpose, a lower anvil 15B is used and an upper sonotrode 15A that emits ultrasound at predetermined frequency or pulse width and generates a thermal effect in the material layers, i.e., in the sequence of leg material and filter material.

Figure 6E:
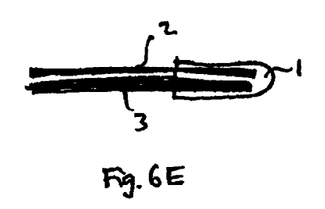

Finally, in FIG. 6E the fluid-tight connection of the end sections of the filter material sheet 2 with the filter material sheet 3 by means of the connecting element 1 is illustrated.

Figure 7A:
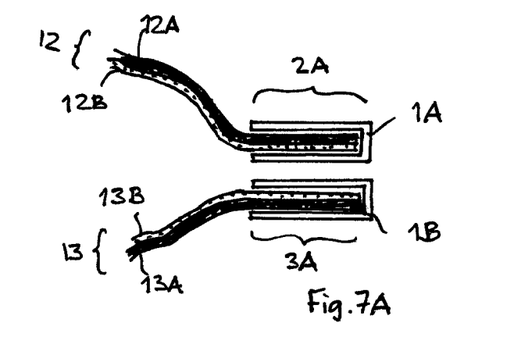

In FIG. 7 a variant of a combined manufacturing process for an embodiment of a connecting element and a method for connecting flat filter media is illustrated. End sections 2A, 3A of two-layer flat filter media 12, 13 are to be connected fluid-tightly with each other. The two end sections 2A, 3A of the filter material sheets 12, 13 that comprise each a first and a second layer 12A, 12B, 13A, 13B are inserted into U-shaped connecting element parts 1A, 1B. This is illustrated in FIG. 7A. The parallel legs of the respective U-shape are resting on both sides of the end sections 2A, 3A. The U-shaped connecting element parts 1A, 1B surround thus the end sections 2A, 3A.

Figure 7B:
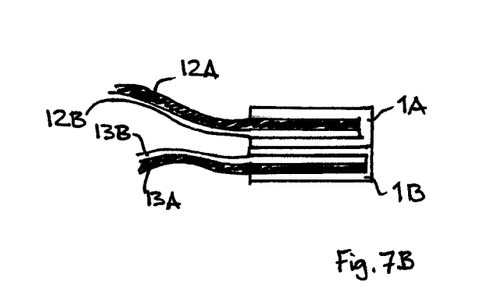

Subsequently, the connecting element parts 1A, 1B with the inserted end sections 2A, 3A are pressed onto each other, as illustrated in FIG. 7B. Two of the legs of the two connecting elements 1A, 1B are contacting each other. One can see in FIG. 7B already the resulting E-shape of the connecting element 1 that results by joining or fusing of the connecting element parts 1A, 1B.

Figure 7C:
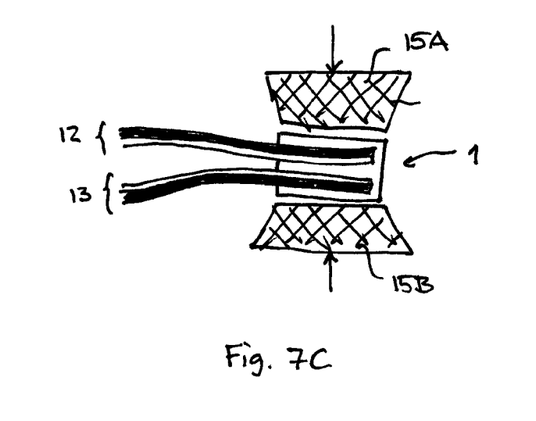

As has been explained already in connection with FIG. 6D, subsequently welding of the connecting element material with the filter material and the connecting element parts 1A, 2A with each other can be realized. This is illustrated in FIG. 7C. One can see a material-monolithic connecting element 1 fixedly connected with the end sections 2A, 3A that provides a fluid-tight connection, for example, for a filter bellows seam. The thermal connection is realized, for example, by means of a sonotrode 15A and an anvil 15B.

Figure 8:
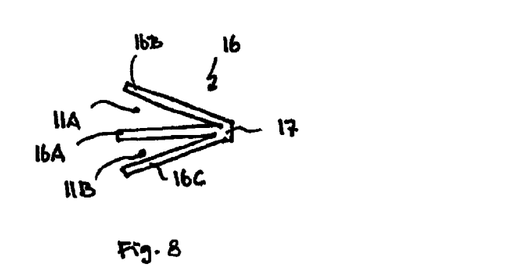
FIG. 8 an illustration of a fourth embodiment of a connecting element.

FIG. 8 shows a profile view of a fourth embodiment of a connecting element. The connecting element 17 has again in cross-section three legs 16A, 16B, 16C that converge at a common edge 17. Between the respective legs 16A and 16B and 16A, 16C there are wedge-shaped openings or insertion means 11A, 11B. The legs 16A, 16B, 16C are thus substantially straight and, beginning at the common edge 17, extend in a fan shape. By means of the, for example adjustable, angle between two legs each, the insertion of the material end section can be facilitated.

Figure 9:
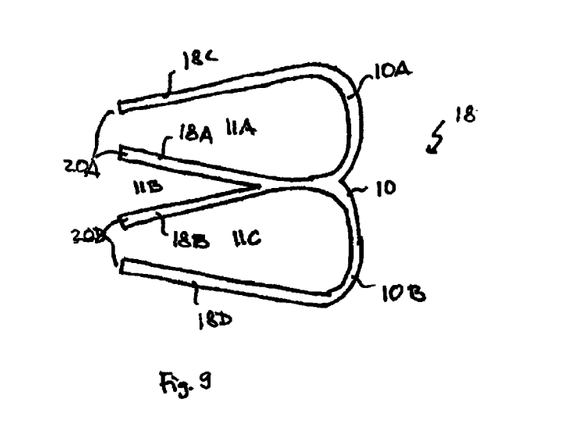
FIG. 9 an illustration of a fifth embodiment of a connecting element.

FIG. 9 shows a profile illustration of a fifth embodiment of a connecting element. The connecting element 18 has four legs 18A, 18B, 18C, 18D that are joined at a common edge 10. In this context, the legs 18A and 18C together with a partial section 10A of the edge 10 form a U-shaped profile wherein the legs are bent toward each other. Also, the legs 18B and 18D that form a common edge together with a partial section 10B, form a U-shaped profile where the legs extend toward each other. In this way, a spring action of the edges 20A of the two legs 18A, 18C or the edges 20B of the legs 18D and 18B relative to each other is generated. By means of the upper edges 20A and lower edges 20B a clamping action is thus provided. By means of the clamping action, for example, filter material end sections can be secured that have been inserted into the intermediate spaces 11A and 11C.

Figure 10:
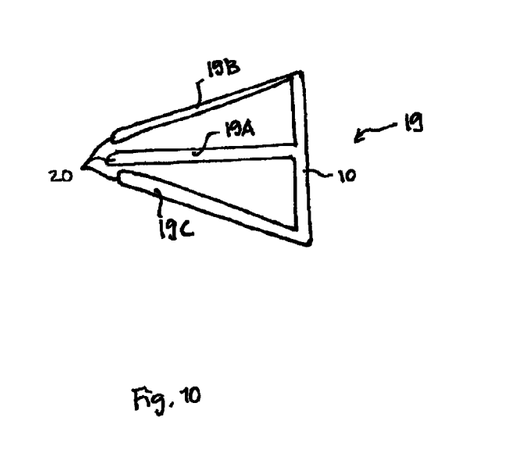
FIG. 10 an illustration of a sixth embodiment of a connecting element.

FIG. 10 shows a further embodiment of a connecting element in which a clamping force by edges 20 of the legs 19A, 19B, 19C can be achieved. The connecting element 19 has therefore a straight edge 10 from which approximately centrally and perpendicularly to the edge 10 a central web or a central leg 19 branches off. The two outer legs 19B and 19C are projecting in such a way from the edge 10 that in the direction toward the edge 20 that is distal to the common edge 10 the legs 19A, 19B, 19C extend toward each other or even contact each other with their edges 20. In this way, a clamping action between the edges 20 is achieved.

Figure 11A:
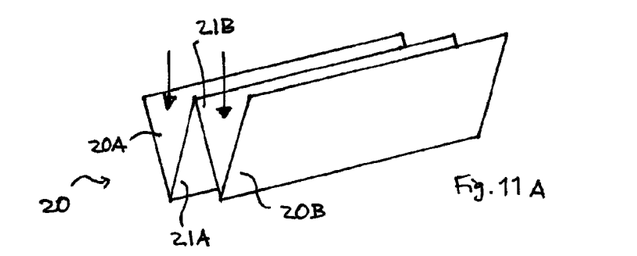
FIGS. 11, 12 illustrations of a seventh embodiment of a connecting element and method steps of a method for connecting flat filter media.
Figure 11B:
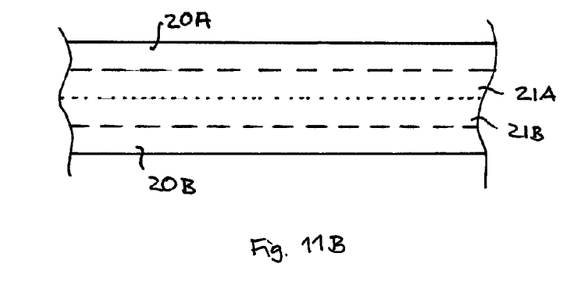

In FIG. 11 a further embodiment of a connecting element is illustrated. The FIG. 11A is a perspective view of a W-shaped connecting element 20 which is formed of a strip of thermoplastic material. The connecting element 20 comprises four legs 20A, 20B, 21A, 21B. In this connection, two outer legs 20A and 20B and two inner legs 21A, 21 are provided. As a result of the folds, as indicated in FIG. 11B, two neighboring grooves or valleys are provided into which, along the illustrated arrows of FIG. 11A, end sections of filter material sheets can be inserted.

FIG. 11B shows a strip of, for example, thermoplastic material with longitudinal folds. In this connection, the dashed lines indicate a first folding orientation and the dotted line indicates a second folding orientation opposite the first one. By folding, a connecting element structure as illustrated in FIG. 11A results.

Figure 12A:
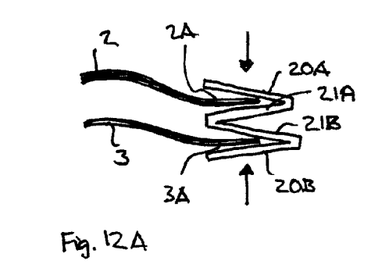
Figure 12B:
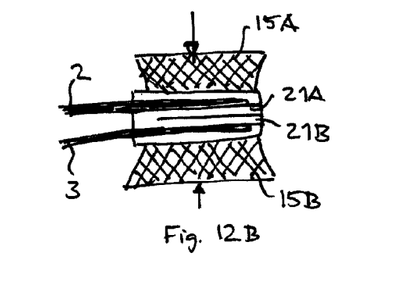
Figure 12C:
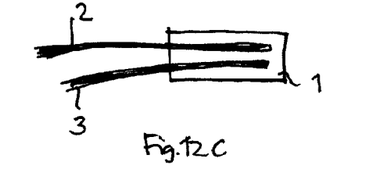

FIGS. 12A to 12C illustrate the use of an appropriate connecting element 20 as illustrated in FIG. 11A. Into the two grooves of the W-shaped profile the end sections 2A, 3A of two filter material sheets 2, 3 are inserted. An inner leg 21A, 21B forms with an outer leg 20A, 20B a groove or a valley, respectively. Subsequently, the legs 20A, 20B, 21A, 21B of the connecting element 20 with the intermediately positioned end sections 2A, 3A are compressed.

As illustrated in FIG. 12B, by means of ultrasonic radiation or other heating and compression the two end sections 2A, 3A and the material of the connecting element 20 can be connected to each other. For example, a lower anvil 15B with a sonotrode 15A is employed. The materials of the connecting element 20 and of the filter medium fuse (partially) when doing so. Also, the two inner legs 21A, 21B are fused fixedly with each other. As a result, as illustrated in FIG. 12C, a similar structure as in FIGS. 6E and 7C with fluid-tightly connected end sections is produced.

Figure 13:
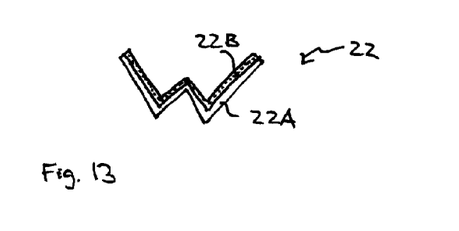
FIG. 13 an illustration of an eighth embodiment of a connecting element.

Finally, FIG. 13 shows a further variant of a connecting element 22 for connecting filter material end sections. The connecting element 22 has in this context two layers. A first support layer 22A serves, for example, as a stabilizing support for a second connecting material layer 22B that comprises a meltable material. The connecting material layer 22B is made of a material which becomes soft upon energy introduction and can penetrate into the filter medium. An appropriate two-component embodiment is also conceivable for other geometries. The side of the connecting element that is facing the filter medium is then only preferably provided with an appropriate connecting material layer 22B.

Therefore, a simple possibility is provided to furnish in particular endless folded bellows with fluid-tight seams or connections. The proposed methods can be implemented in a simple way in manufacturing processes and the connecting elements can be produced easily in a standardized form.

The invention claimed is:

1. A filter element comprising:
    at least two end sections of a flat filter material; and
    a connecting element connecting at least two end sections of a flat filter medium, said connecting element including:
        at least three distally spaced legs;
        wherein at least two intermediate spaces are provided, each intermediate space formed between respective two adjacent legs of said at least three legs;
    wherein end sections of said flat filter medium is inserted into respective ones of said at least two intermediate spaces between respective adjacent legs;
    wherein said end sections are thermally welded to leg material of said two adjacent legs forming said respective intermediate space into which said end section is inserted;
    wherein said filter medium is secured by said welding to said connecting element;
    wherein said connecting element secures said at least two end sections of a flat filter material to said connecting element;
    wherein the connecting element is a flat sheet of material;
    wherein the flat sheet is folded into a W-shaped profile, the folds of the profile forming:
        a first outer leg;
        a second outer leg;
        a first inner leg;
        a second inner leg;
    wherein the first and second inner legs are arranged between the first and second outer legs;
    wherein the first outer leg is connected to the first inner leg at a first fold tip of the folded strip;
    wherein the first inner leg is connected to the second inner leg at a second fold tip of the folded strip;
    wherein the second inner leg is connected to the second outer leg at a third fold tip of the folded strip;
    wherein a first one of the at least two intermediate spaces is a groove formed by the first outer leg and the first inner leg;
    wherein a second one of the at least two intermediate spaces is a groove formed by the second inner leg and the second outer leg.

2. The filter element, comprising:
    at least two end sections of a flat filter material; and
    a connecting element connecting at least two end sections of a flat filter medium, said connecting element including:
        at least three distally spaced legs;
        wherein at least two intermediate spaces are provided, each intermediate space formed between respective two adjacent legs of said at least three legs;
    wherein end sections of said flat filter medium is inserted into respective ones of said at least two intermediate spaces between respective adjacent legs;
    wherein said end sections are thermally welded to leg material of said two adjacent legs forming said respective intermediate space into which said end section is inserted;
    wherein said filter medium is secured by said welding to said connecting element;

wherein said connecting element secures said at least two end sections of a flat filter material to said connecting element;
wherein the connecting element further comprises two overlaying connected layers, said layers comprising:
a support material layer; and
a connecting material layer;
wherein material of said connecting material layer is securely connected with the material of the filter medium, said connecting layer at least partially penetrating said filter medium to secure said filter medium to said connecting element.

3. The filter element according to claim 2, wherein at least one of said filter medium comprises plurality of layers.

4. The filter element according to claim 2, wherein said filter element is part of an operating medium filter, fuel filter, air filter, or a passenger compartment filter of a motor vehicle.

5. The connecting element according to claim 2, wherein the connecting element has an E-shaped profile with respective legs of the E forming the at least three distally spaced legs of the connecting element.

6. The connecting element according to claim 2, wherein
wherein the connecting element is a flat sheet of material;
wherein the flat sheet is folded into a W-shaped profile, the folds of the profile forming:
a first outer leg;
a second outer leg;
a first inner leg;
a second inner leg;
wherein the first and second inner legs are arranged between the first and second outer legs;
wherein the first outer leg is connected to the first inner leg at a first fold tip of the folded strip;
wherein the first inner leg is connected to the second inner leg at a second fold tip of the folded strip;
wherein the second inner leg is connected to the second outer leg at a third fold tip of the folded strip;
wherein a first one of the at least two intermediate spaces is formed by the first outer leg and the first inner leg;
wherein a second one of the at least two intermediate spaces is formed by the second inner leg and the second outer leg.

* * * * *